United States Patent [19]

Thiele et al.

[11] Patent Number: 5,340,241

[45] Date of Patent: Aug. 23, 1994

[54] DEVICE FOR METERING AND ENTRAINING A PRODUCT INTO A GAS STREAM

[75] Inventors: Charles W. Thiele, Kalamazoo; Tunis J. Willemstyn, Richland; Douglas J. Arndt; John J. McMullen, both of Kalamazoo, all of Mich.

[73] Assignee: Motan, Inc., Plainwell, Mich.

[21] Appl. No.: 953,309

[22] Filed: Sep. 29, 1992

Related U.S. Application Data

[63] Continuation-in-part of Ser. No. 830,415, Feb. 4, 1992, abandoned.

[51] Int. Cl.$^5$ .............................................. B65G 53/46
[52] U.S. Cl. ..................................... 406/132; 406/144; 251/147; 251/63.5
[58] Field of Search ............... 406/130, 132, 133, 128, 406/144, 50, 29; 251/147, 318, 63.5, 285

[56] References Cited

U.S. PATENT DOCUMENTS

| | | | |
|---|---|---|---|
| 713,910 | 11/1902 | McLaughlin | 406/132 X |
| 835,919 | 3/1907 | Arcouet | 406/132 X |
| 957,126 | 5/1910 | Tilley et al. | 406/144 |
| 2,100,550 | 11/1937 | Moore | 251/147 X |
| 2,688,423 | 9/1954 | Davis | 406/132 |
| 2,799,965 | 7/1957 | Tutt | 406/130 X |
| 3,197,261 | 7/1965 | Kauffman | 406/128 X |
| 3,403,941 | 10/1968 | Solt | 406/130 X |
| 3,437,384 | 4/1969 | Bozich | 406/128 X |
| 3,479,826 | 11/1969 | Richens | 251/147 X |
| 3,786,962 | 1/1974 | Van Linder | 251/147 X |
| 3,858,943 | 1/1975 | Bose et al. | 406/50 |
| 3,877,241 | 4/1975 | Wade | 62/137 |
| 4,023,713 | 5/1977 | Brotzmann et al. | 406/128 |
| 4,420,279 | 12/1983 | Easley | 406/144 X |
| 4,494,560 | 1/1985 | Napolitano | 251/63.5 X |
| 4,497,599 | 2/1985 | Benatar et al. | 406/132 |
| 4,543,017 | 9/1985 | Beck | 406/132 X |
| 5,092,526 | 3/1992 | Takata | 406/144 X |

FOREIGN PATENT DOCUMENTS

| | | | |
|---|---|---|---|
| 2532794 | 2/1976 | Fed. Rep. of Germany | 406/132 |
| 1404425 | 6/1988 | U.S.S.R. | 406/133 |
| 756694 | 9/1956 | United Kingdom | 406/144 |

Primary Examiner—Andres Kashnikow
Assistant Examiner—Gary C. Hoge
Attorney, Agent, or Firm—Flynn, Thiel, Boutell & Tanis

[57] ABSTRACT

A device for metering and entraining a measured quantity of a dry, powdered and/or granular product with a gas stream moving in a conduit system. The device includes a hollow housing having a gas inlet opening and a gas and product outlet opening to and from, respectively, the interior of the housing connected to the conduit system so that a gas stream enters and exits the housing in the conduit system. Inlet structure of an appropriate size at the gas inlet opening causes the gas stream to move between the inlet opening and the outlet opening through the interior of the housing at a sufficient velocity to pick up and entrain product in the interior of the housing in the gas stream. Product is allowed to enter the housing through a product receiving opening from a product supply container to facilitate a supply of product to the interior of the housing. A gate and a drive therefor is provided for moving the gate between a closed position blocking the product opening and an opened position spaced from the product opening for allowing the product to enter the interior of the housing. Adjustment structure is provided for facilitating an adjustment of the spacing between the gate and the product opening when the gate is in the opened position to facilitate a metering of the volume of product entering the interior of the housing.

17 Claims, 3 Drawing Sheets

FIG. 5

DEVICE FOR METERING AND ENTRAINING A PRODUCT INTO A GAS STREAM

This application is a continuation-in-part of U.S. Ser. No. 07/830,415, filed Feb. 4, 1992 now abandoned.

FIELD OF THE INVENTION

This invention relates to a device for metering and entraining a product into a gas stream and, more particularly, to a device for metering and entraining a measured quantity of the dry, solid particulate with a gas stream moving in a conduit system.

BACKGROUND OF THE INVENTION

In instances where it is desired to convey dry, powdered and/or granular products by an air stream from a place of storage to a machine or like destination in a processing line where the product is used, it is oftentimes necessary to purge the pneumatic conveying system so that the dry, powdered and/or granular products are removed from the conveying system before the air stream is shut off. If the material is not so removed from the conveying system by the time the air stream is shut off, the material will settle within the conveying system and eventually plug the system and/or render its conveying effectiveness less than desired. Thus, conventional valves have been provided in the conveying system to block the flow of dry, powdered and granular product into the conveying system while simultaneously allowing a gas to enter the conveying system for purposes of purging the system. Since material exists in the system from the valve back to the storage device, it is oftentimes difficult to monitor the precise volume of material that may be present in this section of the conveying system. In some instances, the quantity of material so located in this particular section negatively impacts upon the ability of the pneumatic conveying system to appropriately convey the material again after it has settled in the conveying system.

Accordingly, it is an object of this invention to provide a single unit device for adjustably metering the volume of dry, powdered and/or granular product delivered to a vacuum type, pneumatic conveying system and for rendering the product entrained in a gas stream flowing into the conduit system to facilitate conveyance of the entrained product from a place of storage to a machine or like destination in a processing line where the product is to be used.

It is a further object of this invention to provide a single unit device, as aforesaid, which is easy to operate for purposes of controlling variable quantities of product to be delivered to the gas stream to thereby allow for an optimization of the product to gas ratio in the conduit system.

It is a further object of this invention to provide a single unit device, as aforesaid, which is self-cleaning when adapted to vacuum type, pneumatic conveying systems having a purge cycle.

It is a further object of this invention to provide a single unit device, as aforesaid, which has the ability to accommodate differing materials under wholly separate operating conditions and without necessitating a replacement of any of the components in the system.

It is a further object of the invention to provide a single unit device, as aforesaid, wherein the adjustment required to accommodate product of different granular size can be made easily and with a minimum of difficulty.

It is a further object of this invention to provide a single unit device, as aforesaid, wherein the device is adapted to be mounted on existing hopper constructions in the field.

SUMMARY OF THE INVENTION

In general, the objects and purposes of the invention are met by providing a device for metering and entraining a measured quantity of a dry, powdered and/or granular product with a gas stream moving in a conduit system. The device includes a hollow housing having a gas inlet opening to the interior of the housing and a gas and product outlet opening from the interior of the housing. The gas inlet opening and the gas and product outlet opening are connected to the conduit system so that a gas stream enters the housing through the gas inlet opening and exits through the gas and product outlet opening. The gas inlet opening further includes an inlet structure of an appropriate size for causing the gas stream to move between the gas inlet opening and the gas and product outlet opening through the interior of the housing at a sufficient velocity to pick up and entrain product in the interior of the housing in the gas stream. Product is allowed to enter the housing through a product receiving opening. A connection structure is provided for facilitating a connection of the product opening to a product supply container to facilitate a supply of product to the interior of the housing through the product opening. A gate and a drive therefor is provided for moving the gate between a closed position blocking the product opening to the interior of the housing and an opened position spaced from the product opening for allowing the product to enter the interior of the housing. Adjustment structure is provided for facilitating an adjustment of the spacing between the gate and the product opening when the gate is in the opened position to facilitate a metering of the volume of product entering the interior of the housing. The gas stream entering the gas inlet opening picks up and entrains the product therein and exits the housing through the gas and product outlet opening. A movement of the gate to the closed position halts the supply of product to the interior of the housing to allow the gas stream to purge the conduit system of product between the housing and a location to which the product is being sent.

BRIEF DESCRIPTION OF THE DRAWINGS

Further objects and purposes of this invention will be apparent to persons acquainted with apparatus of this general type upon reading the following specification and inspecting the accompanying drawings, in which.

DETAILED DESCRIPTION

Certain terminology may be used in the following description for convenience in reference only and will not be limiting. The words "up" and "down" will designate directions in the drawings to which reference is made. The words "upstream" and "downstream" will refer to the direction of material flow through the device, "upstream" to "downstream" being the normal flow direction. The words "in" and "out" will refer to directions toward and away from, respectively, the geometric center of the device and designated parts thereof. Such terminology will include the words above specifically mentioned, derivatives thereof and words of similar import.

While the following discussion refers to the use of the device in conjunction with an extruder, it is to be understood that the application is broad based and can be applied to the entrainment of various products for delivery to a variety of extruders, injection molding machines, storage silos, mixers and virtually any other receiving vessel or device to which the dry, powdered and/or granular product would have to be conveyed.

Figure 1A:
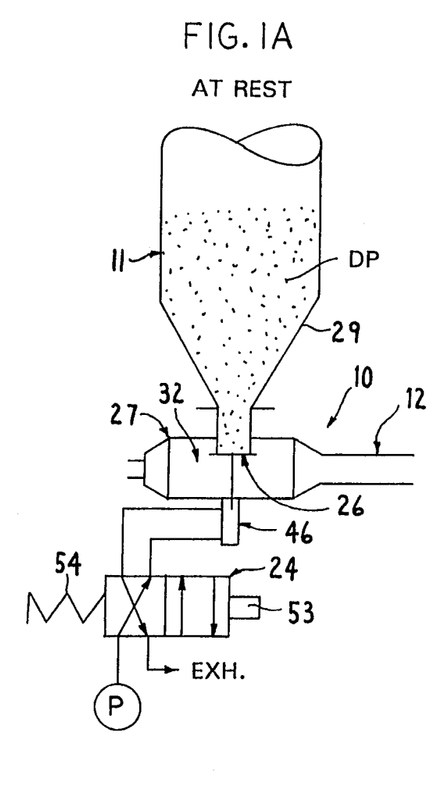
FIG. 1A is a schematic illustration of a product supply container having the device of the invention connected to an outlet opening therefrom, which device is in the "at rest" mode.
Figure 1B:
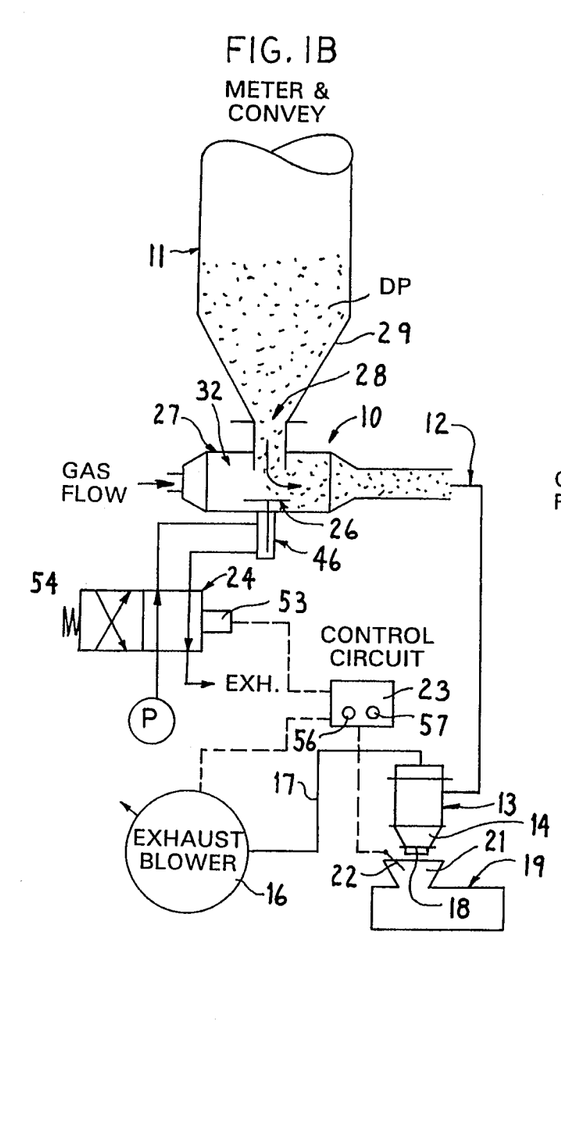
FIG. 1B is a schematic illustration of a product supply container having the device of the invention connected to an outlet opening therefrom, which device is in the "metering and conveying" mode.

FIG. 1B illustrates a pneumatic conveying system 10 particularly adapted to convey a dry, powdered and/or granular, product DP from a material source 11 through a conduit 12 to a vacuum receiver 13 of the type, for example, illustrated in U.S. Pat. No. 4,583,885. The dry, powdered and/or granular product entrained in the gas within the conduit 12, generally air, is extracted from the gas by the vacuum receiver 13 and collected in a hopper 14 oriented immediately below the respective vacuum receiver 13. An exhaust blower 16 is provided and is connected to the vacuum receiver 13 through a conduit 17. At the bottom end of the hopper 14, there is usually provided a gate 18 and beneath the gate 18 is provided, in this particular instance, an extruder 19 having a hopper 21 thereon. A level sensor 22 is provided in the hopper 21 to detect the level of product therein. Conventional control circuitry 23 is provided and is responsive to the level sensor 22 detecting the level of fullness or emptiness of the hopper 21. For example, and upon the level sensor 22 detecting an emptiness of the hopper 21, the control circuitry 23 will activate the exhaust blower 16 to draw a negative pressure in the vacuum receiver 13 and the conduit system 12. Once an appropriate gas velocity has been developed and is occurring in the conduit system 12, the control circuitry 23 will activate a valve 24 to cause pressurized fluid from a source P to open a gate-like structure 26 in a housing 27 oriented below the outlet opening 28 of a product supply source 11, here a supply container 29, to allow the product at atmospheric pressure within the supply container 29 to enter the housing 27 and be entrained in the gas stream flowing through the housing 27 and into the conduit system 12.

Figure 1C:
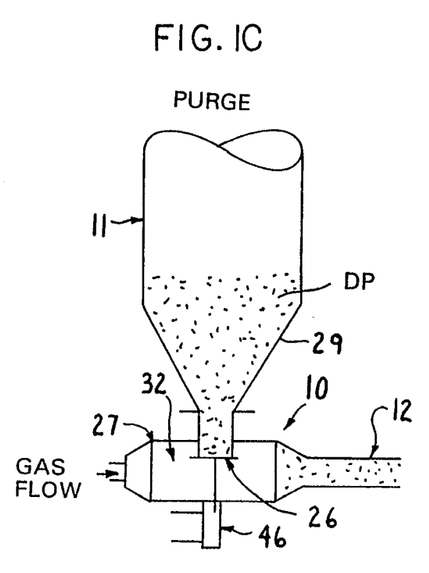
FIG. 1C is a schematic illustration of a product supply container having the device of the invention connected to an outlet opening therefrom, which device is in the "purge" mode.
Figure 2:
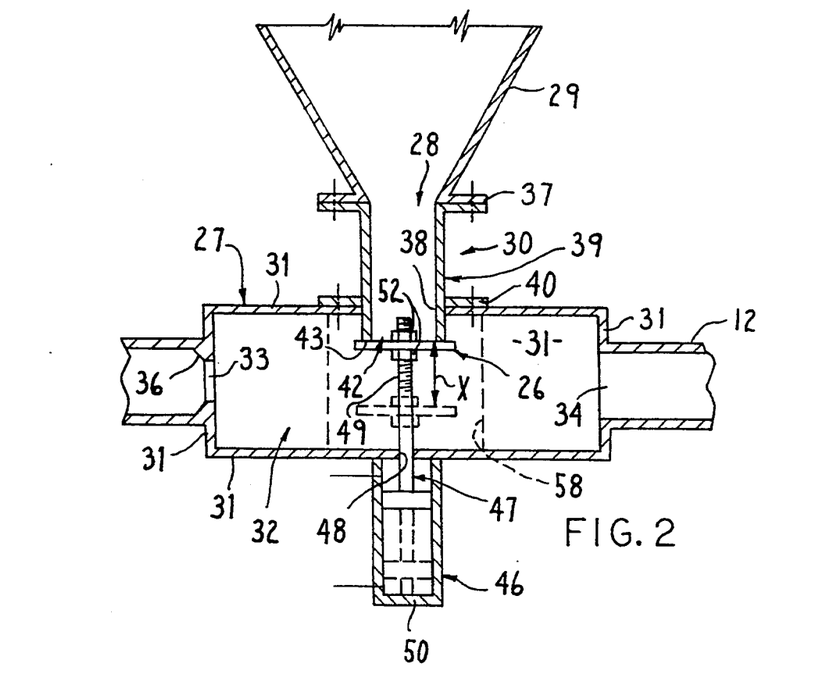
FIG. 2 is a detailed central sectional view of a first embodiment of a combination product metering device and product entrainment device.

Referring now more specifically to the structure illustrated in FIG. 2, FIG. 2 is an enlarged and more detailed illustration of the housing 27 schematically shown in FIGS. 1A–1C. The housing 27 includes a plurality of walls 31 enclosing a chamber 32. The housing 27 has a gas inlet opening 33 in one of the walls 31 to facilitate gas at atmospheric pressure (air) to enter the housing 27. Similarly, a gas and product outlet opening 34 is provided on a further wall 31 of the housing 27. The gas and product outlet opening 34 is connected in a conventional manner to the conduit system 12. In this particular embodiment, the gas inlet opening 33 includes a nozzle-like structure 36 of an appropriate size to provide a gas pick-up velocity at the opening 33 that is sufficient to cause entrainment of product DP entering the housing 27 through the outlet opening 28 in the supply container 29 and further product inlet structure 30 described in more detail below.

The further product inlet structure 30 includes, at the lower end of the product supply container 29, a radially outwardly extending connecting flange 37 encircling the outlet opening 28. The housing 27 has an opening 38 in the upper wall 31 of the housing 27, which opening 38 is preferably coaxially aligned with the opening 28 into the bottom end of the product supply container 29. An elongated and upstanding tubular member 39 is sealing connected, as schematically represented, to and extends between the flange 37 and the upper wall of the housing 27, a flanged construction 40 being provided for this purpose, it being fixedly also secured to an exterior surface of the tubular member 39, as by welding. The lower end 41 of the tubular member 39 extends into the interior of the chamber 32, the open lower end of the tubular member 39 defining a mouth 42 having a peripherally extending lip 43 defined by the exposed lower edge wall of the tubular member 39.

Directly across the housing 27 from the top wall and on the bottom wall of the housing is provided a variable stroke, pneumatic piston and cylinder assembly 46, the piston rod 47 of which is reciprocal through a sealed opening 48 in the bottom wall of the housing. The upper end portion 49 of the piston rod 47 in the chamber 32 is externally threaded. The gate 26 is defined by a plate-like member 51 which is straddled by a pair of internally threaded nuts 52. The nuts 52 are adjustably threadedly engaged with the externally threaded portion 49 of the piston rod 47 so as to allow for an adjustable positioning of the plate 51 along the length of the piston rod 47. In this particular embodiment, the bottom end 50 of the piston-cylinder assembly 46 defines a stop against which the end of the piston rod 47 remote from the threaded end 49 engages when the piston rod is retracted away from the mouth 42 at the lower end of the tubular member 39. With the piston rod fully retracted away from the mouth 42, the nuts 52 may be turned/adjusted relative to the externally threaded portion 49 on the piston rod 47 to vary the distance "X" between the upper surface of the plate 51 and the lip 43 of the tubular member 39. Any convenient access and sealed opening 58 can be provided in a wall of the housing 27 to provide access to the nuts 52.

OPERATION

Although the operation of the invention will be apparent to those skilled in the art, a brief discussion of the operation will be set forth here and below for convenience purposes only.

Referring first to FIG. 1A, FIG. 1A illustrates an "at rest" mode of the pneumatic conveying system 10. In this particular "at rest" mode, the exhaust blower 16 is in the off condition and a solenoid 53 on the valve 24 is deactivated. A spring-like member 54 urges the valve 24 to its right most position as shown in FIG. 1A so that the pressurized fluid source P can direct pressured fluid, such as air, to the lower end of the piston-cylinder assembly 46 to urge the piston thereof upwardly and cause the upper surface of the plate 51 to engage the lip 43 encircling the mouth 42 into the lower end of the tubular member 39. An engagement of the plate 51 with the lip 43 will prevent product from entering the chamber 32 in the housing 27.

As has been stated above, when the level sensor 22 detects a level of emptiness in the hopper 21, for example, of an extruder 19, an appropriate signal will be created and the control circuit 23 will be activated to turn the exhaust blower 16 on to draw a negative pressure in the conduit 17, the vacuum receiver 13, the conduit system 12 and in the chamber 32 of the housing 27. Gas at atmospheric pressure (air) will enter the gas inlet opening 33 into the housing 27 and, due to the nozzle-like structure 36, the pick-up velocity of the gas so entering the chamber 32 will be sufficient to entrain any dry, powdered and/or granular product that may enter the chamber 32 from the product supply container 29. Appropriate timing circuitry is embodied in the control circuit 23 to effect a subsequent activation of the solenoid 53 to urge the valve 24 to its left most position as shown in FIG. 1B against the urging of the spring 54 to cause pressurized fluid from the source P to enter the upper end of the piston-cylinder assembly 46 to drive the piston thereof toward its retracted position causing the lower end of the piston rod 47 to engage the stop 50 defined by the bottom end of the piston-cylinder assembly 46. This will cause the plate 51 to be oriented a distance "X" away from the lip 43 encircling the mouth 42 into the lower end of the tubular member 39. Due in part to a gravitational effect on the product DP and the velocity of the gas in the gas stream flowing through the chamber 32, the dry, powdered and/or granular product DP will become entrained in the gas stream and exit the chamber 32 through the gas and product outlet opening 34 and, thence, be conveyed in the gas entrained form through the conduit system 12 to the vacuum receiver 13.

The control circuit 23 includes additional timing circuitry that will eventually time out and cause the solenoid 53 to be deactivated. At this moment in time, the spring 54 will urge the valve 24 again to its right most position to cause the piston of the piston-cylinder assembly 46 to be driven upwardly to cause the top surface of the plate 51 to move into engagement with the lip 43 encircling the mouth 42 into the lower end of the tubular member 39. The timing circuit will continue to keep the exhaust blower 16 operating in what is referred to as a purge cycle long enough after the gate 26 has been closed so that all product remaining in the chamber 32 of the housing 27 and in the conduit system 12 will be conveyed to the vacuum receiver 13 before the exhaust blower 16 becomes deactivated. Thus, it is assured that the chamber 32 and the conveying system 12 will be devoid of any and all product at the end of the purge cycle so as to prevent product contamination.

The adjustment of the distance "X" determines the amount of the product DP that enters the chamber 32 and, therefore, the product to gas ratio in the conveying system 12. This provides the operator with the requisite control to minimize the likelihood of product plugging the conveying system downstream of the housing 27.

Figure 3:
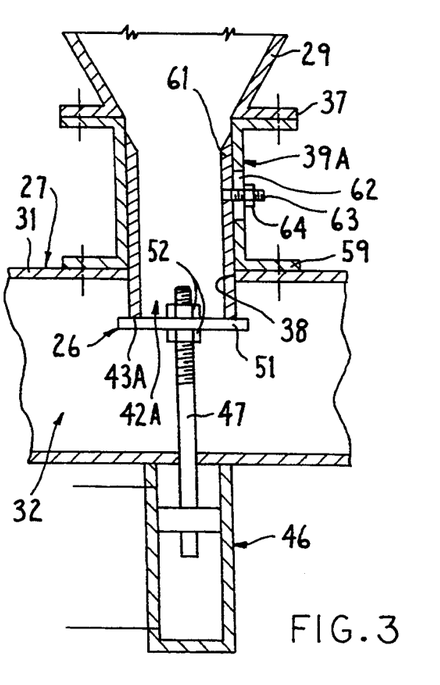
FIG. 3 is a detailed central sectional view of a second embodiment of a combination product metering device and product entrainment device.

ALTERNATE EMBODIMENT (FIG. 3)

FIG. 3 is similar to the embodiment illustrated in FIG. 2, except that it is not intended for the plate 51, while affixed to the piston rod 47 in the same manner as shown in FIG. 2, to be externally accessible for adjustment along the length of the piston rod 47. Instead, a slightly modified tubular member 39A has at its lowermost end a radially outwardly extending flange 59 secured to the upper surface of the upper wall 31 of the housing 27. Further, a second tubular member 61 is received into the interior of the tubular member 39A and, in this particular embodiment, is telescopingly, slidably disposed within what is now the outer tubular member 39A. The lower end of the second tubular member 59 projects through the opening 38 in the upper wall 31 into the chamber 32 of the housing 27. In this particular embodiment, the outer tubular member 39A is modified to include an appropriate elongated, longitudinally extending, slot 62 in the wall of the tubular member 39A through which an externally threaded stud 63 extends and to the outer end of which is threadedly engaged a nut 64. By tightening the nut 64 against the outer surface of the tubular member 39A, the position of the second tubular member 61 can become fixed to the tubular member 39. The stud 63 and nut 64 are externally accessible to facilitate a manual alteration of the distance "X" between the lip 43A encircling the mouth 42A at the lower end of the tubular member 61 and the top surface of the plate 51 on the piston rod 47.

Figure 4:
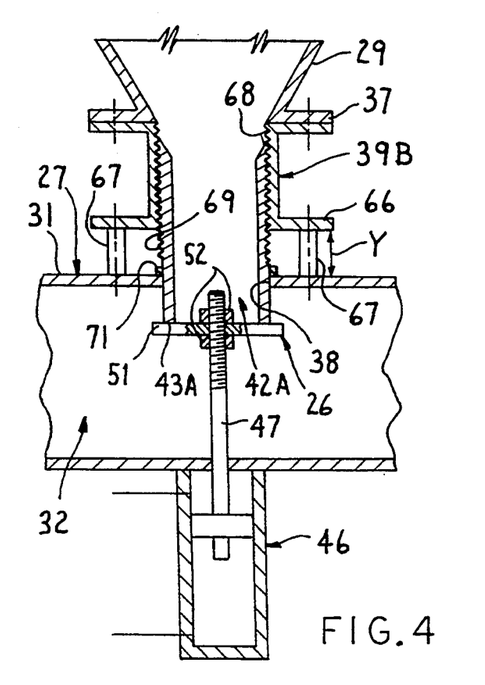
FIG. 4 is a detailed central sectional view of a third embodiment of a combination product metering device and product entrainment device.

ALTERNATE EMBODIMENT (FIG. 4)

In the particular embodiment of FIG. 4, it will be noted that there is no slot in the wall of a still further modified tubular member 39B nor is there any externally accessible threaded stud 63 and nut 64. Instead, a radially outwardly extending flange 66 is provided at the lowermost end of the tubular member 39B. The flange is furthermore elevated above the upper wall 31 of the housing 27 and is supported on a plurality of appropriately circumferentially spaced and elongated spacers 67 connected to and extending between the underside of the flange 66 and the upper surface of the upper wall 31 of the housing 27 so as to define a distance "Y" between the upper surface of the upper wall 31 of the housing 27 and the undersurface of the radially outwardly extending flange 66. The internal surface of the tubular member 39B is internally threaded as at 68. The external surface of the second tubular member 61A is externally threaded as at 69, which internal and external threads are adapted to mate with one another. An annular seal 71 sealingly encircles the outer diameter of the second tubular member 61A and, due to the negative pressure developed within the chamber 32 of the housing 27, is drawn down into snug sealing relation with the upper surface of the wall 31 of the housing 27 as shown in FIG. 4. Upon a rotation of the second tubular member 61A, externally accessible through the spacing "Y", relative to the tubular member 39B, the second tubular member 61A will be caused to move up and down within the tubular element 39B to cause a variation in the spacing "X" between the upper surface of the plate 51 and the lip 43A encircling the mouth 42A of the second tubular member 61A.

Figure 5:
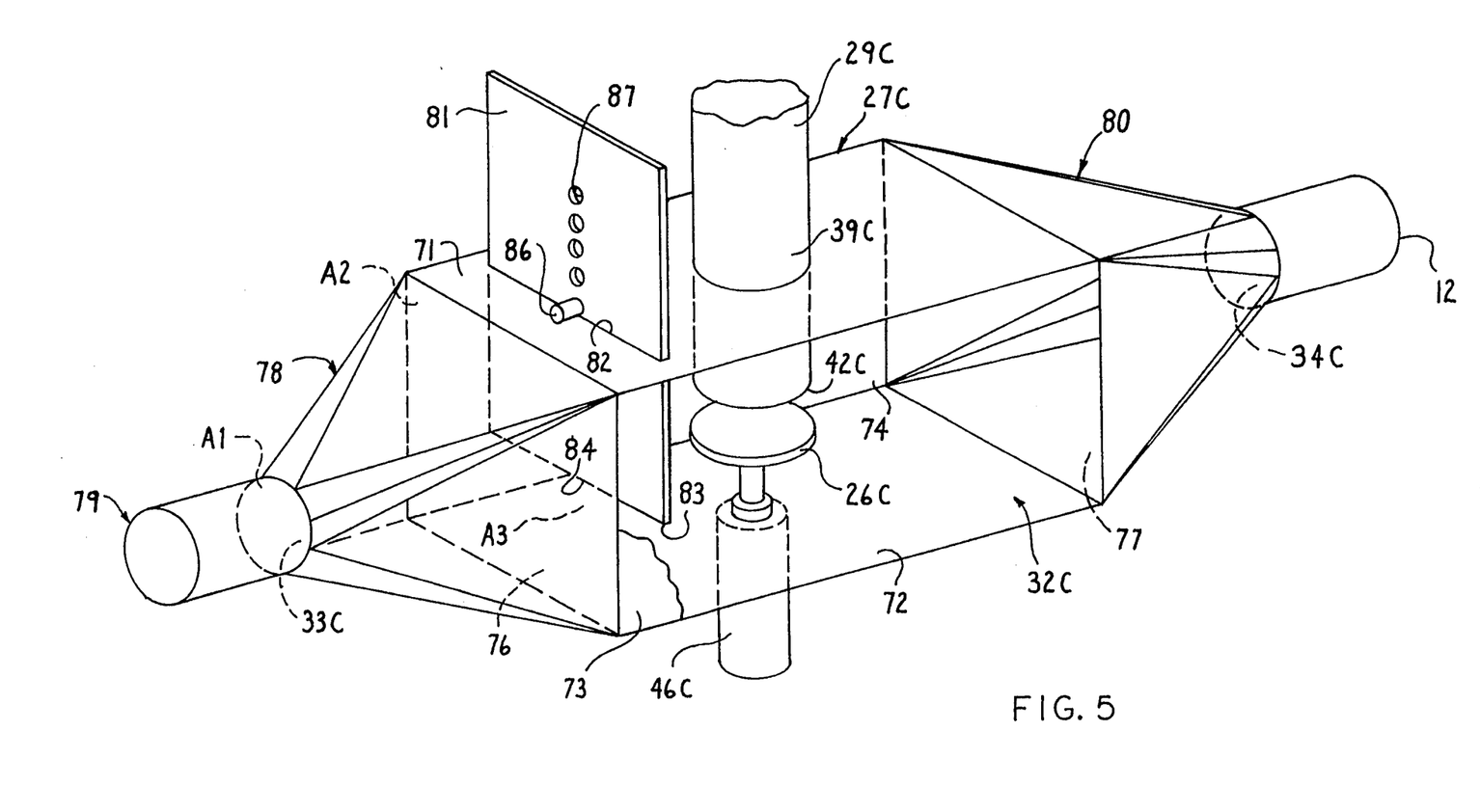
FIG. 5 is a schematic isometric view of a fourth embodiment of a combination product metering device and product entrainment device.

ALTERNATE EMBODIMENT (FIG. 5)

In FIG. 5, the same reference numbers which have been used above to describe the structure have again been used, except that the suffix "C" has been added thereto. Only the modified structure of FIG. 5 will be described in detail.

The housing 27C includes a plurality of walls enclosing a chamber 32C. In this particular embodiment, the housing 27C is a cubical-shaped or rectangular-shaped box having spaced top and bottom walls 71 and 72, spaced front and rear walls 73 and 74, only a fragment of the front wall 73 being shown, and spaced end walls 76 and 77. The housing has a gas inlet opening 33C in one of the end walls 76. Similarly, a gas and product outlet opening 34C is provided on a further end wall 77 of the housing 27C. The gas and product outlet opening 34C is connected as described above to the conduit system 12.

The gas inlet opening 33C includes, if desired, a connector 78 which, in this embodiment, facilitates a gas tight connection of a gas inlet housing 79 of a first cross-sectional area A1 to the end wall 76 or an opening in the end wall 76 having a second cross-sectional area A2. In this embodiment A1 is less than A2. Similarly, a like structure 80 can be employed to provide a gas tight connection of an opening in the end wall 77 to the conduit system 12.

The product supply container 29C is mounted to the top wall 71 of the housing 27C in the same manner as has been described above. In addition, the variable stroke pneumatic piston and cylinder assembly 46C is mounted to the bottom wall 72 of the housing 27C. The gate-like structure 26C cooperates with the mouth 42C of the product dispensing opening at the lower end of the tubular member 39C in the same manner as has been described above.

An additional feature about the housing 27C that is different from the above-described embodiments is the provision of an elevatable slide gate 81 receivable in a slot 82 provided in the top wall 71 of the housing 27C that is upstream of the mouth 42C of the product dispensing opening. The width of the gate 81 conforms to the spacing between the inside facing surfaces of the front and rear walls 73 and 74. If desired, a guide track or groove can be provided in the inside facing surfaces of the walls 73 and 74 to guide the movement of the slide gate 81. The gate 81 is selectively manually adjustable to the desired elevation in order to space the lower edge 83 of the gate 81 a selectable distance upwardly from an inside facing surface of the bottom wall 72 of the housing 27C. In other words, an opening 84 is having a variable cross-sectional area A3 is defined between the front and rear walls 73 and 74 of the housing 27C and between the lower edge 83 of the gate 81 and the inside facing surface of the bottom wall 72 of the housing 27C. The gate 81 can be fixed by any convenient means, as by a pin 86 received in a selected one of a plurality of vertically spaced holes 87 in the gate.

The variable area A3 regulatable by a selective positioning of the gate 81 allows the velocity of atmospheric air entering the gas inlet opening 33C to be controlled in a region immediately upstream of the mouth 42C and below a plane containing the mouth 42C. The air velocity at this point is called the "pick-up velocity" and is expressed in fpm (feet per minute). The regulatable pick-up velocity enables a granular product DP of a specific weight per cubic foot to be properly entrained in the air stream and leave the housing 27C through the gas and product outlet opening 34C. For example, a material weighing 30 lbs/cu-ft (a polyethylene pellet) might require 3000 fpm whereas a material, such as a mineral filled nylon at a density of 50 lbs/cu-ft would require a pick-up velocity in the range of 4000 to 5000 fpm. The variable adjustment of the position of the lower edge 84 of the gate 81 from the bottom wall 72 will allow the desired pick-up velocities to be achieved and keep the interior of the housing 27C "clean" after each conveying cycle. If the pick-up velocity is inadequate, product DP will fill the housing and air entrainment will not occur. No product DP must remain in the housing 27C after each conveying cycle to assure the delivery of a desired volume of material to the desired destination. Further, providing a minimum conveying velocity is important in order to assure proper material acceleration, minimize product degradation and reduce equipment wear.

It is considered within the scope of the invention to provide a cylindrically-shaped housing, or at least a differently shaped housing 27 and a conforming gate structure 81. That is, the lower edge 83 of the gate would be conformed so as to be compatible with the opposing surface of the interior of the housing.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a conveying system for intermittently conveying a dry, solid particulate product through a conduit system interconnecting a product supply container to a desired destination, the conduit system having a gas inlet end for facilitating the entry of a gas stream into the conduit system and a gas outlet end for facilitating the exit of the gas stream from the conduit system, and a gas pumping means for pumping the gas stream through the conduit system, the improvement comprising an intermittently operated device for metering and entraining a measured quantity of the product with a gas stream moving in the conduit system, said device including:

a hollow housing having first means defining a gas inlet opening to an interior of said housing and connected in fluid communication with the gas inlet end, and second means defining a gas and product outlet opening from the interior of said housing, said gas inlet opening and said gas product outlet opening being series connected to the conduit system so that a gas stream enters the housing through said gas inlet opening from the gas inlet end and exits through said gas and product outlet opening, said gas inlet opening including inlet means of an appropriate size for causing the gas stream to move between said gas inlet opening and said gas and product outlet opening through said interior of said housing at a sufficient pick-up velocity to pick up and entrain product in said interior of said housing in the gas stream;

third means defining a product receiving opening into said interior of said housing intermediate said gas inlet opening and said gas and product outlet opening;

connection means for facilitating a connection of said product receiving opening to the product supply container to facilitate a supply of the product to said interior of said housing through said product receiving opening;

normally closed gate means oriented within said housing so as to directly intersect a path of the gas stream, and drive means for moving said gate means between a closed position blocking said product receiving opening to the interior of said housing and an opened position spaced from said product receiving opening for allowing the product to enter the interior of said housing and a flow of the gas stream between said product receiving opening and said gate means to thereby cause the gas stream to pick up and entrain product oriented between said product receiving opening and said gate means and move the product toward and out of said gas and product outlet opening;

control means for intermittently operating said drive means and said gate means to said opened position for a selected interval of time; and adjustment means for facilitating an adjustment of the spacing between said gate means and said product receiving opening to a set dimension that said gate means always moves to when said gate means is in said opened position to facilitate a controlled metering of the volume of product entering the interior of said housing and assuring a removing of product from a region between said product receiving opening and said gate means by the gas stream, whereby the gas stream entering said gas inlet opening picks up and entrains the product in said region and exits said housing through said gas and product outlet opening, said control means effecting a movement of said gate means to said closed position thereof at an end of said selected interval of time to halt the supply of product to said interior of said housing while said gas pumping means continues operating to enable the gas stream to purge the housing and the conduit system of product between said housing and the desired location.

2. The device according to claim 1, wherein said third means defining said product receiving opening includes a mouth portion with a peripherally extending lip facing said interior of said housing; and wherein said gate means includes a plate member movable to said closed position whereat said plate member engages the entirety of said peripherally extending lip to block said product receiving opening thereat.

3. The device according to claim 2, wherein said drive means includes a variable stroke piston-cylinder assembly mounted on said housing and having a piston rod reciprocally supported on said piston-cylinder assembly and extending into said interior of said housing and coupled to said plate member.

4. The device according to claim 3, wherein said adjustment means includes said piston rod being externally threaded at least on a portion thereof that is inside said interior of said housing; and wherein said plate member includes an internally threaded means threadedly engaged with said external thread so that when said variable stroke piston-cylinder assembly retracts said plate member away from said peripherally extending lip, the relative position of said plate member on said piston rod can be adjustable by manually relatively rotating said internally threaded means and said externally threaded portion.

5. The device according to claim 4, wherein said variable stroke piston-cylinder assembly includes a stop means to which said piston rod is always retracted to establish a reference position for said piston rod before the relative position of said plate member to said piston rod is established.

6. The device according to claim 3, wherein said connection means includes an elongated and hollow first tubular member, a first end of said first tubular member including a first connecting means adapted for connection to the product supply container, a second end of said tubular member including a second connecting means adapted for connection to and opening into said interior of said housing; and wherein an elongated and hollow second tubular member is mounted in an axially reciprocal, telescoping relation to said first tubular member, one end of said second tubular member terminating in said interior of said housing and defining said mouth portion with said peripherally extending lip.

7. The device according to claim 6, wherein said variable stroke piston-cylinder assembly includes a stop means to which said piston rod is always retracted to establish a reference position for said piston rod before the relative position between said first and said second tubular members is established and, thence, the relative position of said mouth portion and said plate member is established.

8. The device according to claim 7, wherein said adjustment means includes said first and second tubular members being axially slidably related, one relative to the other, and to establish the space between said mouth portion and said plate member, and a locking means for fixedly locking the relative axial relation between said first and second tubular members together.

9. The device according to claim 7, wherein said adjustment means includes said first and second tubular members being threadedly connected together, a rotation of one relative to the other establishing the space between said mouth portion and said plate member, said threaded connection providing a lock for fixedly locking the relative axial relation between said first and second tubular members.

10. The device according to claim 1, wherein a timed control means is provided for controlling a first interval of time during which the pumping means pumps a gas stream through said interior of said housing and through said conduit system, and a second interval of time during which said drive means effects an opening of said gate means.

11. The metering device according to claim 10, wherein said first interval of time is greater than said second interval of time.

12. The metering device according to claim 1, wherein said inlet means includes a further gate means for varying the appropriate size of said gas inlet opening and, thence, said pick-up velocity.

13. The metering device according to claim 12, wherein said further gate means includes a slide gate, wherein said housing has an interior wall surface opposing an edge of said slide gate, said slide gate and said edge thereon being movable toward and away from said interior wall surface to regulate the appropriate size of said inlet means.

14. The metering device according to claim 13, wherein said inlet means is oriented generally entirely below a plane containing said product receiving opening.

15. The metering device according to claim 13, wherein said interior wall surface of said housing is a bottom wall of said housing, said edge of said slide gate being oriented below a plane containing said product receiving opening.

16. The metering device according to claim 15, wherein said housing is at least one of a cubical-shaped and rectangular-shaped housing, wherein said product receiving opening is in a top wall of said housing having means defining a slot therethrough located intermediate said product receiving opening and said gas inlet opening, and wherein said slide gate is slidably received in said slot and includes means for fixing a selected position thereto to said housing.

17. The metering device according to claim 1, wherein said control means includes means for regulating a time interval that said gas pumping means operates relative to said selected interval of time that said gate means is in said opened position; said time interval being greater than said selected interval of time.

* * * * *

UNITED STATES PATENT AND TRADEMARK OFFICE
CERTIFICATE OF CORRECTION

PATENT NO. : 5 340 241

DATED : August 23, 1994

INVENTOR(S) : Charles W. THIELE et al.

It is certified that error appears in the above-identified patent and that said Letters Patent is hereby corrected as shown below:

Column 8, line 50; after "gas" (second occurrence)
insert ---and---.

Signed and Sealed this

First Day of November, 1994

Attest:

BRUCE LEHMAN

Attesting Officer

Commissioner of Patents and Trademarks